(12) United States Patent
Zhu

(10) Patent No.: US 12,105,328 B2
(45) Date of Patent: Oct. 1, 2024

(54) CONNECTION STRUCTURE OF AN ADAPTER AND A CONNECTOR

(71) Applicant: HYC Co., Ltd, Guangdong (CN)

(72) Inventor: Lei Zhu, Guangdong (CN)

(73) Assignee: HYC Co., Ltd, Guangdong (CN)

(*) Notice: Subject to any disclaimer, the term of this patent is extended or adjusted under 35 U.S.C. 154(b) by 364 days.

(21) Appl. No.: 17/454,766

(22) Filed: Nov. 12, 2021

(65) Prior Publication Data

US 2022/0326450 A1 Oct. 13, 2022

(30) Foreign Application Priority Data

Apr. 9, 2021 (CN) .......................... 202110384209.2

(51) Int. Cl.
*G02B 6/38* (2006.01)
(52) U.S. Cl.
CPC ......... *G02B 6/3825* (2013.01); *G02B 6/3885* (2013.01); *G02B 6/3893* (2013.01)
(58) Field of Classification Search
CPC ...................................................... G02B 6/38
USPC ........................................................ 385/78
See application file for complete search history.

(56) References Cited

U.S. PATENT DOCUMENTS

| | | | | |
|---|---|---|---|---|
| 2004/0072454 A1* | 4/2004 | Nakajima | ............ | G02B 6/3825 439/79 |
| 2012/0288238 A1* | 11/2012 | Park | ..................... | G02B 6/3823 385/80 |
| 2013/0163934 A1* | 6/2013 | Lee | ....................... | G02B 6/3879 385/78 |
| 2017/0219779 A1* | 8/2017 | Takano | ................ | G02B 6/3831 |
| 2018/0292618 A1* | 10/2018 | Chang | ................... | G02B 6/3874 |

FOREIGN PATENT DOCUMENTS

| | | |
|---|---|---|
| CN | 103630982 A | 3/2014 |
| CN | 108196343 A | 6/2018 |
| CN | 109188611 A | 1/2019 |
| CN | 111913255 A | 11/2020 |

(Continued)

OTHER PUBLICATIONS

International Search Report, mailed on Jan. 7, 2022, PCT Patent Application No. PCT/CN2021/120716, International Filing Date Sep. 26, 2021.

(Continued)

*Primary Examiner* — Kaveh C Kianni
(74) *Attorney, Agent, or Firm* — ArentFox Schiff LLP

(57) ABSTRACT

A connection structure of the adapter and the connector includes an adapter and a connector engaging with the adapter in a snap-fit manner. The adapter is provided with a mounting hole. A first positioning boss is disposed on the inner wall of the mounting hole. The connector includes a connector housing and a ferrule flange. The connector housing engages with the adapter in a snap-fit manner. A sliding recess and a first positioning recess that communicate with each other are disposed on the connector housing in the axial direction of the connector housing. The first positioning boss is configured to selectively match the sliding recess or the first positioning recess. A first end of the ferrule flange engages with the outer end face of the connector housing in a snap-fit manner. A second end of ferrule flange extends into the adapter.

7 Claims, 3 Drawing Sheets

(56) References Cited

FOREIGN PATENT DOCUMENTS

| | | | | | |
|---|---|---|---|---|---|
| CN | 112415670 | A | | 2/2021 | |
| CN | 112840257 | A | * | 5/2021 | ............. G02B 6/381 |
| CN | 112946831 | A | | 6/2021 | |
| CN | 214409381 | U | | 10/2021 | |

OTHER PUBLICATIONS

Office action dated Apr. 30, 2024 from corresponding Chinese Application No. 202110384209.2.

* cited by examiner

CONNECTION STRUCTURE OF AN ADAPTER AND A CONNECTOR

CROSS-REFERENCES TO RELATED APPLICATIONS

This application claims priority to Chinese Patent Application No. 202110384209.2, filed on Apr. 9, 2021, the disclosure of which is expressly incorporated by reference herein in its entirety.

TECHNICAL FIELD

The present disclosure relates to the technical field of fiber-optic communication elements and, in particular, to a connection structure of an adapter and a connector.

BACKGROUND

An adapter is used for connecting two connectors in a fiber-optic cabling system and is usually assembled onto an adapter panel or a chassis. As an important fiber-optic connection component, the adapter is widely applicable to a television network, a local area network, video transmission, a fiber-optic communication system, and fiber to the home (FTTH). In the related art, much space is occupied when an adapter is connected to a connector. As the requirement for high-density optical fibers increases, the excessive volume of the related adapter and connector fails to satisfy the application of high-density optical fibers.

SUMMARY

The present disclosure provides a connection structure of an adapter and a connection so as to reduce the volume of the adapter and connector, reduce the space occupied when the adapter is connected to the connector, and implement the application of higher-density optical fibers.

The present disclosure adopts the technical solutions below.

The present application provides a connection structure of an adapter and a connector. The connection structure of the adapter and the connector includes an adapter and a connector.

The adapter is provided with a mounting hole. A first positioning boss is disposed on the inner wall of the mounting hole.

The connector includes a connector housing and a ferrule flange.

The connector housing partially extends into the adapter and engages with the adapter in a snap-fit manner. A sliding recess and a first positioning recess that communicate with each other are disposed on the connector housing in the axial direction of the connector housing. The first positioning boss is configured to selectively match the sliding recess or the first positioning recess so as to make the connector housing rotatable or stationary relative to the adapter.

A first end of the ferrule flange passes through the connector housing and engages with the outer end face of the connector housing in a snap-fit manner. A second end of the ferrule flange extends into the adapter.

Figure 1:
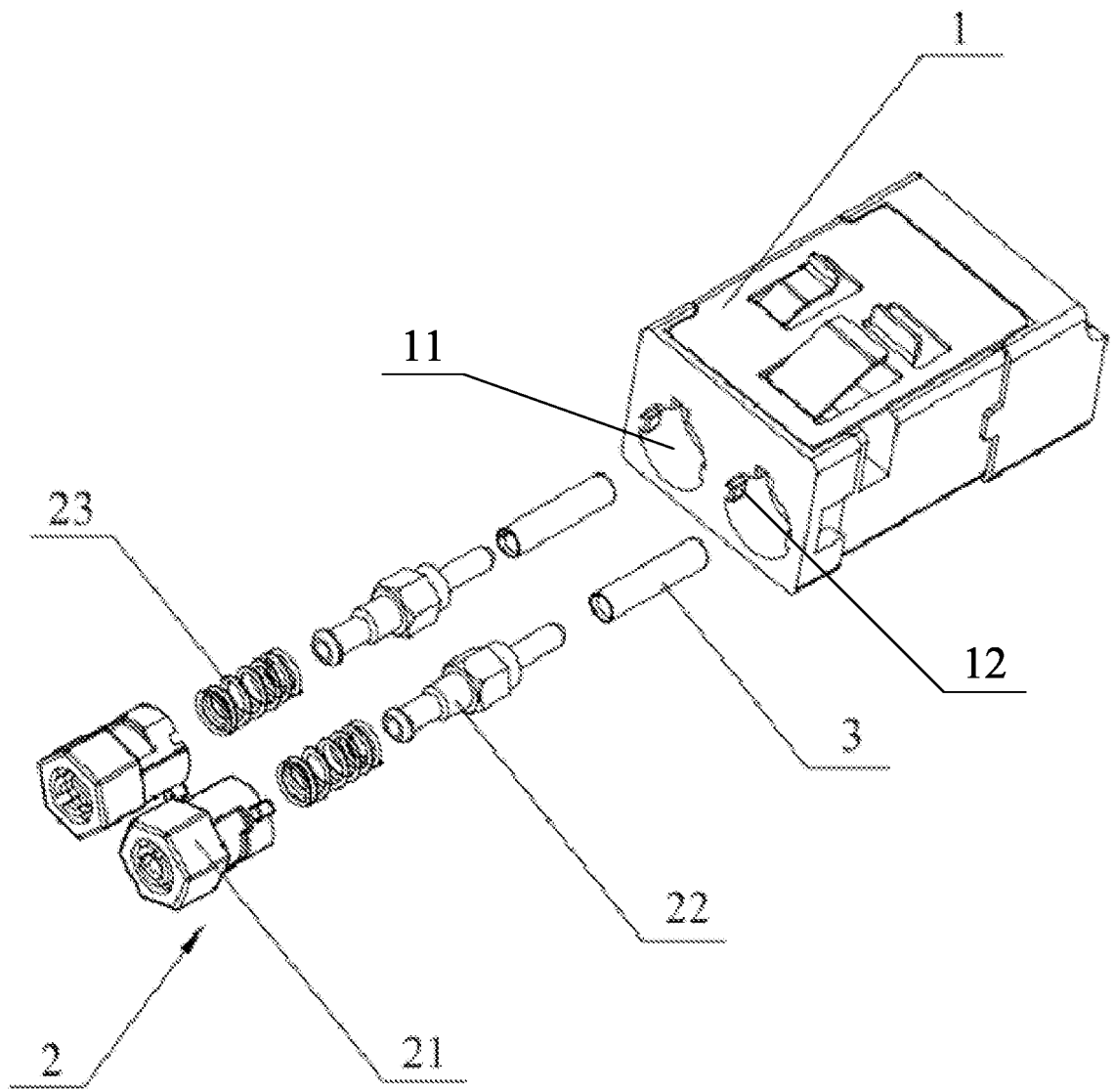
FIG. 1 is an exploded view of a connection structure of an adapter and a connector according to the present disclosure.

REFERENCE LIST 1 adapter
11 mounting hole
12 first positioning boss
2 connector
21 connector housing
211 sliding recess
212 first positioning recess
213 second positioning recess
22 ferrule flange
221 first end
222 second end
223 second positioning boss
23 elastic member
3 sleeve

DETAILED DESCRIPTION

Technical solutions of the present disclosure are further described hereinafter in conjunction with embodiments and drawings. It is to be understood that the embodiments described herein are intended to explain the present disclosure. In addition, it should be noted that for ease of description, only the part, instead of all, related to the present disclosure is illustrated in the drawings.

In the description of the present disclosure, it should be noted that unless otherwise expressly specified and limited, the term "mounting", "connected to each other" or "connected" is to be construed in a broad sense, for example, as securely connected or detachably connected; mechanically connected or electrically connected; directly connected to each other or indirectly connected to each other via an intermediary; or internally connected between two elements. For those of ordinary skill in the art, meanings of the preceding terms in the present disclosure may be construed based on situations.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

As shown in FIGS. 1 to 4, this embodiment provides a connection structure of an adapter and a connector. The connection structure of the adapter and the connector includes an adapter 1 and a connector 2 engaging with the adapter 1 in a snap-fit manner. The adapter 1 is provided with a mounting hole 11. A first positioning boss 12 is disposed on the inner wall of the mounting hole 11. The connector 2 includes a connector housing 21 and a ferrule flange 22. The connector housing 21 partially extends into the adapter 1 and engages with the adapter 1 in a snap-fit manner. A sliding recess 211 and a first positioning recess 212 that communicate with each other are disposed on the connector housing 21 in the axial direction of connector housing 21. The first positioning boss 12 is configured to selectively match the sliding recess 211 or the first positioning recess 212. When the first positioning boss 12 matches the sliding recess 211, the first positioning boss 12 is able to slide in the extension direction of the sliding recess 211 so that the connector housing 21 rotates relative to the adapter 1. When the first positioning boss 12 matches the first positioning recess 212, the connector housing 21 is restricted from rotating along the adapter 1. A first end 221 of the ferrule flange 22 passes through the connector housing 21 and engages with the outer end face of the connector housing 21 in a snap-fit manner. A second end 222 of the ferrule flange 22 extends into the adapter. Specifically, two first positioning bosses 12 are provided in this embodiment.

Figure 2:
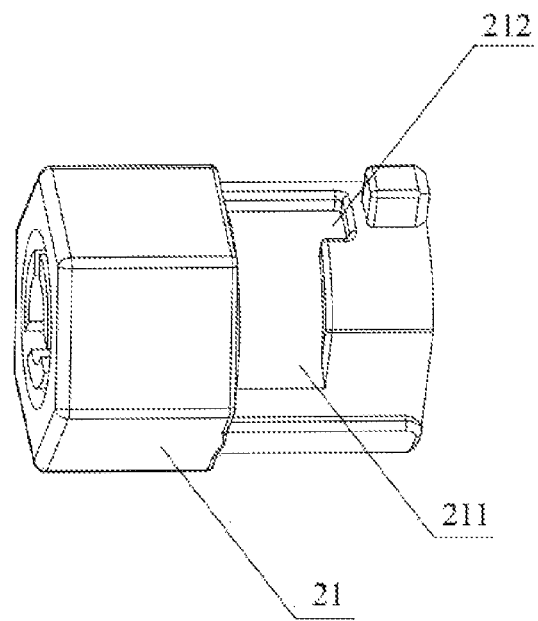
FIG. 2 is a view illustrating the structure of a connector housing according to the present disclosure.
Figure 3:
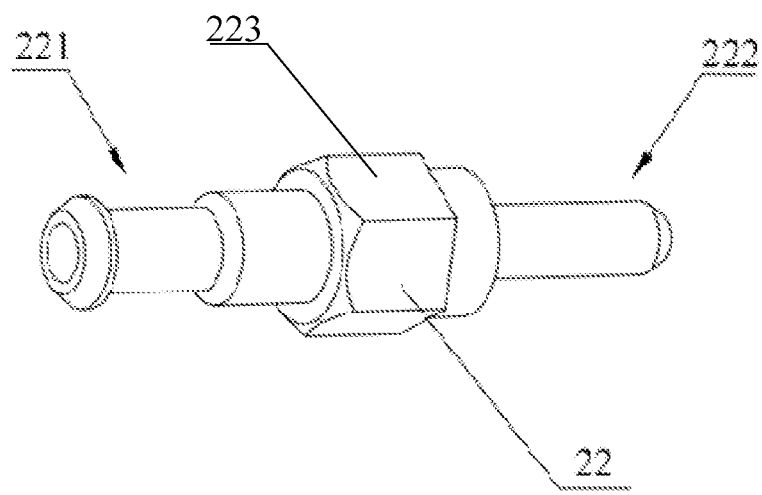
FIG. 3 is a view illustrating the structure of a ferrule flange according to the present disclosure.
Figure 4:
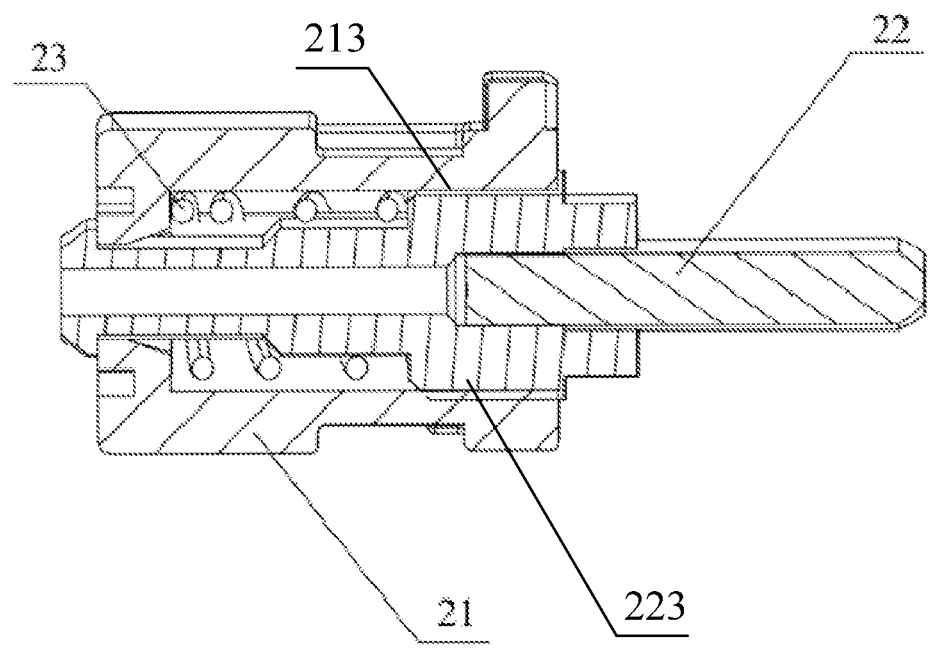
FIG. 4 is a sectional view of a connector according to the present disclosure.

In an embodiment, referring to FIGS. 1 to 2, the length of the sliding recess 211 in the circumferential direction of the connector housing 21 is greater than the length of first positioning recess 212 in the circumferential direction of the connector housing 21. With this configuration, when the first positioning boss 12 is engaged with the first positioning recess 212, the first positioning boss 12 can slide relative to the connector housing 21, within the sliding recess 211, and in the circumferential direction of the connector housing 21. When the first positioning boss 12 is engaged with first positioning recess 212, the first positioning boss 12 is limited by the inner walls of the first positioning recess 212 so that connector housing 21 is stationary relative to the adapter 1.

In this embodiment, the connector housing 21 is configured to partially extend into the adapter 1 so as to engage with the adapter 1 in a snap-fit manner. Moreover, the first end 221 of the ferrule flange 22 passes through the connector housing 21 and the second end 222 of the ferrule flange 22 is disposed in the adapter 1, so that the connection between the adapter 1 and the connector 2 is compact, the volume of the adapter 1 and connector 2 is reduced to the greatest extend, the space occupied when the adapter 1 is connected to the connector 2 is reduced, and the application of higher-density optical fibers is implemented.

Optionally, one of the adapter 1 and the connector housing 21 is provided with a guide recess, and the other one of the adapter 1 and the connector housing 21 is provided with a buckle matching the guide recess. This arrangement provides a direction for the connection between the adapter 1 and the connector housing 21 and ensures that the first positioning boss 12 matches the sliding recess 211 or the first positioning recess 212.

Optionally, the connector 2 further includes an elastic member 23 sleeved on the first end 221 of the ferrule flange 22 and abutting against the inner wall of the connector housing 21. Specifically, in this embodiment, the elastic member 23 is a compression spring. The compression spring provides the force for the ferrule flange 22 away from the connector housing 21 and prevents the ferrule flange 22 from moving in the axial direction of the connector housing 21.

Optionally, the aperture diameter of the outer end face of the connector housing 21 is smaller than the outer diameter of the first end 221 of the ferrule flange 22. After the first end 221 of the ferrule flange 22 passes through the connector housing 21, the first end 221 of the ferrule flange 22 abuts against the outer end face of the connector housing 21 so as to complete the snapping-fit of the ferrule flange 22 and the connector housing 21 and ensure that the ferrule flange 22 is not separated from the connector housing 21. Optionally, a tapered guide face is disposed on the inner wall of the connector housing 21 on a side of the connector housing 21 facing the outer end face of the connector housing 21. In this embodiment, the maximum inner diameter of the tapered guide face is equal to the outer diameter of the first end 221 of the ferrule flange 22. The minimum inner diameter of the tapered guide face is equal to the aperture diameter of the outer end face. When the first end 221 of the ferrule flange 22 passes through the tapered guide face, the outer diameter of the first end 221 is reduced continuously under the action of the external force provided by the tapered guide face. After the first end 221 passes through the tapered guide face and extends out of the connector housing 21, the first end 221 snaps into the outer end face of the connector housing 21 under the action of resilience. It is to be noted that in other embodiments, the maximum inner diameter of the tapered guide face may be slightly greater or smaller than the outer diameter of the first end 221 of the ferrule flange 22 as long as the aperture diameter of the outer end face of the connector housing 21 is smaller than the outer diameter of the first end 221 of the ferrule flange 22.

Optionally, a second positioning recess 213 is disposed on the inner wall on a side of the connector housing 21 facing the adapter 1. A second positioning boss 223 corresponding to the second positioning recess 213 is disposed on the ferrule flange 22 in the circumferential direction of the ferrule flange 22. The second positioning boss 223 matches the second positioning recess 213 to limit the rotation of the ferrule flange 22 relative to the connector housing 21. Optionally, the second positioning boss 223 is polygonal. In this embodiment, the second positioning boss 223 is hexagonal. Correspondingly, the second positioning recess 213 is hexagonal. In other embodiment, the second positioning boss 223 and the second positioning recess 213 may be of other shapes that complement each other as long as it ensures that the rotation of the ferrule flange 22 relative to the connector housing 21 is limited.

In the present disclosure, the connector is configured to partially extend into the adapter so as to engage with the adapter in a snap-fit manner. Moreover, the first end of the ferrule flange passes through the connector housing and the second end of the ferrule flange is disposed in the adapter, so that the connection between the adapter and the connector is compact, the volume of the adapter and connector is reduced to the greatest extend, the space occupied when the adapter is connected to the connector is reduced, and the application of higher-density optical fibers is implemented.

What is claimed is:
1. A connection structure of an adapter and a connector, comprising:
   an adapter provided with a mounting hole, wherein a first positioning boss is disposed on an inner wall of the mounting hole; and
   a connector, wherein the connector comprises:
   a connector housing partially extending into the adapter and engaging with the adapter in a snap-fit manner, wherein a sliding recess and a first positioning recess that communicate with each other are disposed on the connector housing in an axial direction of the connector housing, and the first positioning boss is configured to selectively match the sliding recess or the first positioning recess so as to make the connector housing rotatable or stationary relative to the adapter; and a ferrule flange, wherein a first end of the ferrule flange passes through the connector housing and engages with an outer end face of the connector housing in a snap-fit manner, and a second end of the ferrule flange extends into the adapter, wherein an aperture diameter of the outer end face of the connector housing is smaller than an outer diameter of the first end of the ferrule flange, and wherein a tapered guide face is disposed on an inner wall of the connector housing on a side of the connector housing facing the outer end face of the connector housing, and a minimum inner diameter of the tapered guide face is equal to the aperture diameter of the outer end face of the connector housing.

2. The connection structure of the adapter and the connector according to claim 1, wherein the connector further comprises an elastic member sleeved on the first end of the ferrule flange and abutting against an inner wall of the connector housing.

3. The connection structure of the adapter and the connector according to claim 2, wherein the elastic member is a compression spring.

4. The connection structure of the adapter and the connector according to claim 1, further comprising a sleeve sleeved on the second end of the ferrule flange.

5. The connection structure of the adapter and the connector according to claim 1, wherein a second positioning recess is disposed on an inner wall of the connector housing on a side of the connector housing facing the adapter, a second positioning boss corresponding to the second positioning recess is disposed on the ferrule flange in a circumferential direction of the ferrule flange, and the second positioning boss matches the second positioning recess to limit rotation of the ferrule flange relative to the connector housing.

6. The connection structure of the adapter and the connector according to claim 5, wherein the second positioning boss is polygonal.

7. A connection structure of an adapter and a connector, comprising:

an adapter provided with a mounting hole, wherein a first positioning boss is disposed on an inner wall of the mounting hole; and a connector, wherein the connector comprises:

a connector housing partially extending into the adapter and engaging with the adapter in a snap-fit manner, wherein a sliding recess and a first positioning recess that communicate with each other are disposed on the connector housing in an axial direction of the connector housing, and the first positioning boss is configured to selectively match the sliding recess or the first positioning recess so as to make the connector housing rotatable or stationary relative to the adapter; and a ferrule flange, wherein a first end of the ferrule flange passes through the connector housing and engages with an outer end face of the connector housing in a snap-fit manner, and a second end of the ferrule flange extends into the adapter;

wherein a second positioning recess is disposed on an inner wall of the connector housing on a side of the connector housing facing the adapter, a second positioning boss corresponding to the second positioning recess is disposed on the ferrule flange in a circumferential direction of the ferrule flange, and the second positioning boss matches the second positioning recess to limit rotation of the ferrule flange relative to the connector housing;

wherein the second positioning boss is polygonal.

\* \* \* \* \*